United States Patent [19]

Rilly et al.

[11] Patent Number: 4,876,636
[45] Date of Patent: Oct. 24, 1989

[54] SWITCHING POWER SUPPLY HAVING AN EMERGENCY MODE REGULATING VOLTAGE ON THE PRIMARY SIDE

[75] Inventors: Gerard Rilly, Unterkirnach; Jose-Ignacio Rodriguez, Villingen, both of Fed. Rep. of Germany

[73] Assignee: Deutsche Thomson-Brandt GmbH, Villingen-Schwenningen, Fed. Rep. of Germany

[21] Appl. No.: 219,974

[22] Filed: Jul. 15, 1988

[30] Foreign Application Priority Data

Jul. 16, 1984 [DE] Fed. Rep. of Germany ....... 3723484

[51] Int. Cl.$^4$ ............................................. H02M 3/335
[52] U.S. Cl. .......................................... 363/21; 363/56
[58] Field of Search .............................. 363/19, 21, 56

[56] References Cited

U.S. PATENT DOCUMENTS

| 4,315,303 | 2/1982 | Snyder | 363/21 |
| 4,703,410 | 10/1987 | Pepper | 363/56 |
| 4,763,236 | 8/1988 | Usui | 363/19 |

FOREIGN PATENT DOCUMENTS

| 2713676 | 10/1978 | Fed. Rep. of Germany | 363/19 |
| 3130958 | 4/1982 | Fed. Rep. of Germany | . |
| 3524767 | 1/1987 | Fed. Rep. of Germany | . |
| 3527000 | 2/1987 | Fed. Rep. of Germany | . |

OTHER PUBLICATIONS

J.—Y. Couet et al., "Gepulste Rückkopplung: Eine neue Schaltnetzteil-Architektur", Elektronik, vol. 15, Jul. 1986, pp. 117–120.
Patents Abstracts of Japan, Application No. 57-27185, E-211, vol. 7, No. 258, Nov. 1983.
Patents Abstracts of Japan, Application No. 55-23862, E-87, vol. 5, No. 198, Dec. 1981.
Patents Abstracts of Japan, Application No. 58-212899, E-350, vol. 9, No. 258, Oct. 1985.

Primary Examiner—William H. Beha, Jr.
Attorney, Agent, or Firm—Spencer & Frank

[57] ABSTRACT

A switching power supply in which a regulating voltage generated on the secondary side of the circuit is transferred to a control circuit on the primary side of the circuit so as to stabilize the dc operating voltages produced on the secondary side. In order to avoid the dangers involved from the absence of such regulation, a further or emergency regulating voltage is generated on the primary side of the circuit and if the regulating voltage from the secondary side is absent, the system is automatically switched to the further regulating voltage generated on the primary side, which further regulating voltage regulates the operating voltages to at most the rated values and preferably to values that are reduced by up to 10%.

12 Claims, 1 Drawing Sheet

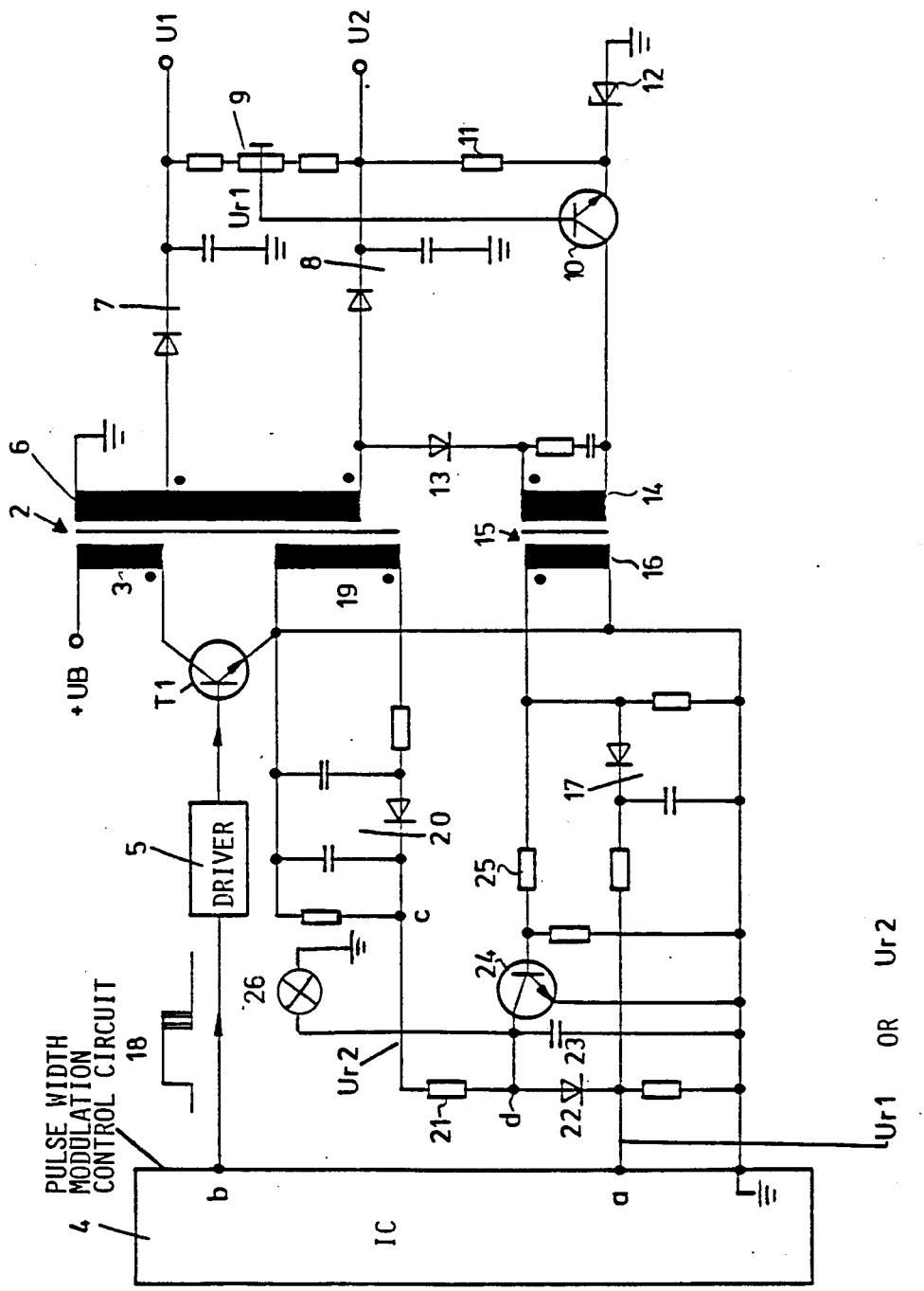

SWITCHING POWER SUPPLY HAVING AN EMERGENCY MODE REGULATING VOLTAGE ON THE PRIMARY SIDE

BACKGROUND OF THE INVENTION

The present invention relates to a switching power supply or converter. More particularly, the present invention relates to such a switching power supply wherein a regulating voltage for the power supply is generated on the secondary side of the circuit and is transferred to a control circuit on the primary side of the circuit so as to stabilize or regulate the dc or operating voltages generated on the secondary side.

In a prior art switching power supply, a regulating voltage is derived from the pulse voltage across the transformer or from the operating voltage generated on the secondary side of the transformer, and thus of the power supply circuit. This regulating voltage controls a control circuit for a switching transistor provided on the primary side in the sense of a pulse width modulation, so that the pulses which control the switching transistor to be conductive are modulated and the operating voltages generated on the secondary side are stabilized.

It is also known to obtain a regulating voltage on the secondary side from a generated operating voltage, to convert this regulating voltage into a pulsed voltage which has been amplitude modulated with the regulating voltage, to transfer the amplitude modulated pulsed voltage to the primary side via a transformer, and to there reconvert the modulated pulsed voltages, by means of a rectifier, back to a regulating voltage which is then fed to the control input terminal of the control circuit.

If such a regulating circuit malfunctions, e.g. due to an interruption in the line or a faulty component, there exists the danger that the switching transistor provided on the primary side is controlled to be conductive for too long a period of time and excess voltages result on the secondary side.

SUMMARY OF THE INVENTION

It is an object of the present invention to provide reliable protection in a simple manner if a regulation originating on the secondary side of the power supply circuit is malfunctioning.

The above object is achieved according to the present invention by a switching power supply including a transformer having a primary winding and a secondary winding, a switching transistor connected to the primary winding, a control circuit means, having a control input terminal and responsive to a regulating voltage at the control input terminal, for controlling the switching of the transistor for causing same to produce a pulsed voltage in the primary winding, rectifier circuit means, connected to the secondary winding, for producing at least one operating voltage at its output, and further circuit means for generating a first regulating voltage from the at least one operating voltage, and for feeding the first regulating voltage to the control input terminal of the control circuit means to control same to stabilize the at least one operating voltage to a rated value; and further comprising: an emergency regulating voltage circuit means for generating a second regulating voltage disposed on the primary side of the transformer, with the second regulating voltage having a value such that, when applied to the control input, it causes regulation of the at least one operating voltage to at most the rated value of the at least one operating voltage; and switch circuit means for automatically switching the second regulating voltage to the control input terminal in the absence of the first regulating voltage.

Thus, in the solution according to the invention, the absence of the regulating voltage at the control input terminal of the control circuit effective on the primary side inevitably causes the system to be switched to a second regulating voltage which is generated in a separate circuit on the primary side. This regulating circuit on the primary side is dimensioned in such a manner that the operating voltages generated on the secondary side are regulated to the same rated values, or preferably to values reduced by up to 10%, i.e. values below the rated value. Regardless of the reason why the regulating voltage derived on the secondary side is absent at the control terminal of the control circuit, reliable protection is provided in that the regulation on the primary side, which is not active during normal operation, takes over regulation of the switching transistor if the regulation from the secondary side is absent.

The switching power supply according to the invention is particularly applicable for use in a television receiver or in a video recorder.

The present invention will be described in greater detail with reference to an embodiment which is illustrated in the drawing figure.

BRIEF DESCRIPTION OF THE DRAWING

The FIGURE is a simplified schematic representation of a switching power supply according to the invention.

DETAILED DESCRIPTION OF THE PREFERRED EMBODIMENT

Referring now to the FIGURE, there is shown a switching power supply including a switching transistor T1 on the primary side of the circuit and having its emitter-collector path connected in series with an operating coil or primary winding 3 of a transformer 2 between a voltage source +UB and ground. The base of switching transistor T1 is controlled in a known manner by the output of a pulse-width modulation control circuit 4, in the form of an IC, via a driver circuit 5. On the secondary side of transformer 2, there is provided a secondary winding 6 which is connected to two rectifier circuits 7 and 8 which generate two operating or dc voltages U1 and U2 at their respective outputs. A potentiometer 9 connected between the outputs of rectifier circuits 7 and 8 provides a regulating voltage Ur1 which is proportional to voltage U1 and which is fed to the base of a transistor 10. The emitter of transistor 10 receives a reference voltage of 5.6 V generated by a resistor 11, which is connected between the output of rectifier circuit 8 and the emitter of transistor 10, and a Zener diode 12, which is connected between the emitter of transistor 10 and ground. Via a diode 13, the collector of transistor 10 receives pulses from the secondary winding 6 of transformer 2. Thus, transistor 10 acts as a modulator which furnishes pulses that are amplitude modulated with the regulating voltage Ur1 to a winding 14 of a further transformer 15. These Ur1 modulated pulses applied to winding 14 are obtained from an output winding 16 of transformer 15 and are reconverted to regulating voltage Ur1 in a rectifier circuit 17. This reconverted regulating voltage is fed to control input terminal a of the control circuit 4 and there produces a pulse width modulation of pulses 18 which are provided to the base of transistor T1 by control circuit 4. The widths of pulses 18, and thus the turn-on duration of transistor T1, are controlled or varied according to the magnitude of regulating voltage Ur1 across the potentiometer 9, resulting in the amplitude of operating voltages U1 and U2 being regulated in such a manner that these operating voltages U1 and U2 are stabilized.

The primary side of the circuit additionally includes a regulating winding 19 for transformer 2 which winding furnishes, via a rectifier circuit 20, a second or emergency regulating voltage Ur2 at point c. This voltage Ur2 is likewise a function of the amplitude of the pulsed voltage across transformer 2. Voltage Ur2 is fed via a series resistor 21 to one terminal of a diode 22 whose other terminal is connected to control input terminal a of control circuit 4. A capacitor 23 is connected between the common junction point d of resistor 21 and diode 22 and ground. Emergency regulating voltage Ur2 causes the capacitor 23 to be charged in the positive direction.

To control the charging of capacitor 23, the collector-emitter path of a transistor 24 is connected in parallel with the capacitor 23. The base of transistor 24 receives the pulsed voltage from winding 16 of transformer 15 via a resistor 25. Transistor 24 is thus periodically controlled to be conductive at the pulse repetition rate of the circuit and causes capacitor 23 to be discharged to ground. The circuit is dimensioned in such a manner that, during charging of capacitor 23 until it begins to discharge via transistor 24, the voltage value at point d reaches only such values which cause diode 22 to remain blocked. During this normal operating process, point d and control input terminal a of circuit 4 thus remain separated from one another, so that emergency regulating voltage Ur2 has no influence on control input terminal a and regulation takes place only with regulating voltage Ur1.

If now a fault in the circuit causes the pulsed voltage across transformer 2 and therefore also across transformer 15 to be absent or this voltage takes on dangerously low values and thus regulation with Ur1 is no longer effective or is no longer properly effective, transistor 24 is no longer controlled to be conductive. Regulating voltage Ur2 now positively charges capacitor 23 to the extent that diode 22 becomes conductive. Now circuit point d is connected to control input terminal or point a and regulating voltage Ur2 becomes effective at point a, instead of the no longer existing regulating voltage Ur1, and takes over the regulation in the described manner. The entire circuit now operates in the so-called emergency mode with primary-side regulating circuit 19, 20, 21, 22 and takes care that operating voltages U1 and U2 are unable to take on unduly high values. Additionally the regulating circuit 19–22 on the primary side is dimensioned in such a manner that the operating voltages U1 and U2 are regulated to at most the rated value and preferably to a reduced value, i.e. a value below the rated value. Preferably, the values of U1 and U2 are regulated by regulating voltage Ur2 to lie approximately 0 to 10% below the rated values when regulating voltage Ur1 is effective, i.e. for normal operation. If the reduction is greater, there exists the danger that the circuit remains stationarily in the emergency mode with regulating voltage Ur2, which is undesirable, and does not automatically change back to normal operation with regulating voltage Ur1. The increasing voltage across point d may actuate an indicator for such a state, e.g. switch on an LED, as an indication that a malfunction has occurred and the entire switching power supply has switched to regulation from the primary side.

The FIGURE shows a LED 26 connected to point d and serving as an indicator. When the voltage at point d increases due to an emergency mode the LED is controlled to be active to show the operator that there now is an emergency mode and that something should be done to bring the circuit back to normal operation.

In principle, switching to regulation from the primary side, i.e., via voltage Ur2 may also be effected by means of a switch disposed between points c and a, with such switch remaining blocked by regulating voltage Ur1 and being automatically opened to switch voltage Ur2 to point a if regulating voltage Ur1 is absent.

In a preferred embodiment of the circuit shown in the FIGURE, the elements shown have the following values:

| | |
|---|---|
| Transistor T1 | type BUD47A |
| IC4 | type UC3842 from SGS and Motorola |
| Rectifier circuit 7 | diode MUR 115, C = 220 $\mu$F |
| Rectifier circuit 8 | diode BYV 28, C = 1000 $\mu$F |
| Potentiometer 9 | 1 kOhm |
| Transistor 10 | type BC 548 B |
| Resistor 11 | 560 Ohm |
| Diode 12 | type ZPD 5V6 |
| Diode 13 | type MUR 115 |
| Rectifier circuit 17 | diode 1N4148, C = 220 nF |
| Rectifier circuit 20 | diode type MUR 115, C = 47 $\mu$F |
| Resistor 21 | 34 kOhm |
| Diode 22 | type 4148 |
| Capacitor 23 | 10 nF |
| Transistor 24 | type BC 548 B |
| Resistor 25 | 10 kOhm |
| Voltage U1 | + 5 V |
| Voltage U2 | + 12 V |
| Voltage + UB | +290 V |

The invention now being fully described, it will be apparent to one of ordinary skill in the art that many changes and modifications can be made thereto without departing from the spirit or scope of the invention as set forth herein.

What is claimed:

1. In a switching power supply including a transformer having a primary winding and a secondary winding, a switching transistor connected to said primary winding, a control circuit means, having a control input terminal and responsive to a regulating voltage at said control input terminal, for controlling the switching of said transistor for causing same to produce a pulsed voltage in said primary winding, rectifier circuit means, connected to said secondary winding, for producing at least one operating voltage at its output, and further circuit means for generating a first regulating voltage from said at least one operating voltage, and for feeding said first regulating voltage to said control input terminal of said control circuit means to control same to stabilize said at least one operating voltage to a rated value; the improvement wherein said further circuit means for generating said first regulating voltage comprises means for producing a regulating voltage value proportional to said at least one operating voltage, means for producing a pulsed voltage, means for amplitude modulating said pulsed voltage with said regulating voltage value, a further transformer having first and second windings with said first winding being connected to receive the modulated pulsed voltage, and a rectifier connected between said second winding of said further transformer and said control input terminal; and further comprising an emergency regulating voltage circuit means for generating a second regulating voltage disposed on the primary side of said transformer, with said second regulating voltage having a value such that, when applied to said control input, it causes regulation of said at least one operating voltage to at most said rated value of said at least one operating voltage, and a switching circuit means for automatically switching said second regulating voltage to said control input terminal in the absence of said first regulating voltage.

2. A switching power supply as defined in claim 1, wherein said second regulating voltage has a value such that it causes regulation of said at least one operating voltage to reduced values with respect to said rated value.

3. A switching power supply as defined in claim 1 wherein said means for providing a pulsed voltage to be modulated is connected to said secondary winding of said transformer of said switching power supply and is responsive to the pulsed voltage provided therein.

4. A switching power supply as defined in claim 1 wherein: the output of said emergency regulating voltage circuit means, and hence said second regulating voltage, is connected to said control input terminal via a diode; and said switching circuit means comprises means for blocking said diode during normal operation when said first regulating voltage is present.

5. A switching power supply as defined in claim 4, wherein said means for blocking said diode includes: a parallel connection of a capacitor and the emitter-collector path of a further transistor connected between said output of said emergency regulating voltage circuit means and ground; and means connecting the base of said further transistor to said second winding of said further transformer to receive the modulated pulsed voltage produced in said further transformer.

6. A switching power supply as defined in claim 1 further comprising an indicator means for indicating the operating state when said second regulating voltage is being supplied to said control input terminal.

7. A switching power supply as defined in claim 1 wherein said control circuit means is a pulse-width modulation circuit.

8. In a switching power supply including a transformer having a primary winding and a secondary winding, a switching transistor connected to said primary winding, a control circuit means, having a control input terminal and responsive to a regulating voltage at said control input terminal, for controlling the switching of said transistor for causing same to produce a pulsed voltage in said primary winding, rectifier circuit means, connected to said secondary winding, for producing at least one operating voltage at its output, and further circuit means for generating a first regulating voltage from said at least one operating voltage, and for feeding said first regulating voltage to said control input terminal of said control circuit means to control same to stabilize said at least one operating voltage to a rated value; the improvement comprising: an emergency regulating voltage circuit means for generating a second regulating voltage disposed on the primary side of said transformer, with said second regulating voltage having a value such that, when applied to said control input, it causes regulation of said at least one operating voltage to at most said rated value of said at least one operating voltage; a diode connecting the output of said emergency regulating voltage circuit means, and hence said second regulating voltage, to said control input terminal; and switching circuit means for automatically switching said second regulating voltage to said control input terminal in the absence of said first regulating voltage, said switching circuit means comprising means for blocking said diode during normal operation when said first regulating voltage is present.

9. A switching power supply as defined in claim 8 wherein said second regulating voltage has a value such that it causes regulation of said at least one operating voltage to reduced values which lie up to 10% below said rated value.

10. A switching power supply as defined in claim 8 further comprising an indicator means for indicating the operating state when said second regulating voltage is being supplied to said control input terminal.

11. A switching power supply as defined in claim 8 wherein said control circuit means is a pulse-width modulation circuit.

12. A switching power supply as defined in claim 8 wherein said emergency regulating voltage circuit means includes a regulating winding for said transformer and responsive to the pulsed voltage produced in said transformer via said primary winding, and a rectifier connected to said regulating winding.

* * * * *

UNITED STATES PATENT AND TRADEMARK OFFICE
CERTIFICATE OF CORRECTION

PATENT NO. : 4,876,636

DATED : October 24th, 1989

INVENTOR(S) : Gerard Rilly and Jose-Ignacio Rodriquez

It is certified that error appears in the above-identified patent and that said Letters Patent is hereby corrected as shown below:

On the title page:

In the heading of the patent, under [30], please change the priority application year from "1984" to --1987--.

Signed and Sealed this

Fifteenth Day of January, 1991

Attest:

HARRY F. MANBECK, JR.

Attesting Officer

Commissioner of Patents and Trademarks